United States Patent [19]
Culpepper, Jr.

[11] 3,886,854
[45] June 3, 1975

[54] APPARATUS FOR DISPOSING OF AIRBORNE PARTICULATE MATTER AND COOKING MEANS

[75] Inventor: Clifford Culpepper, Jr., Charlotte, N.C.

[73] Assignee: Aero-Dyne Manufacturing, Inc., Charlotte, N.C.

[22] Filed: Jan. 31, 1973

[21] Appl. No.: 328,247

[52] U.S. Cl.......... 98/115 K; 23/277 C; 55/DIG. 36; 55/126; 55/342; 55/416; 55/459
[51] Int. Cl............................................. B01d 50/00
[58] Field of Search.. 55/6, 124, 126, 128, DIG. 36, 55/315, 316, 337, 342, 345, 383, 384, 385, 459, 467, 472, 476; 98/115 R, 115 K; 52/6, 173, 750; 110/1 R, 1 M, 8 A, 8 R, 18 A, 18 C; 431/5, 7, 8, 326, 328, 329, 350, 347; 432/72; 34/72; 23/277 C

[56] References Cited
UNITED STATES PATENTS

| | | | |
|---|---|---|---|
| 970,530 | 9/1910 | Miller | 55/416 |
| 1,934,311 | 11/1933 | Kegerreis et al. | 55/416 X |
| 2,678,616 | 5/1954 | Kay | 55/314 X |
| 2,770,318 | 11/1956 | Triggs | 126/299 |
| 2,779,468 | 1/1957 | King et al. | 55/315 X |
| 2,815,427 | 12/1957 | Schaefer | 55/DIG. 36 |
| 3,164,445 | 1/1965 | Hampel | 126/299 |
| 3,221,635 | 12/1965 | Hill, Jr. | 98/115 K |
| 3,260,189 | 7/1966 | Jensen | 126/299 |
| 3,381,453 | 5/1968 | Dills | 55/385 X |
| 3,393,497 | 7/1968 | Donnelly | 55/472 X |
| 3,418,788 | 12/1968 | Sugimoto | 55/DIG. 9 |
| 3,421,290 | 1/1969 | Cheney, et al. | 52/6 X |
| 3,444,669 | 5/1969 | Panzica et al. | 261/DIG. 9 |
| 3,618,659 | 11/1971 | Rawl | 165/59 X |
| 3,668,833 | 6/1972 | Cahill, Jr. | 110/18 R |
| 3,747,301 | 7/1973 | Glover et al. | 55/126 |
| 3,796,549 | 3/1974 | Hall | 431/326 X |

FOREIGN PATENTS OR APPLICATIONS

| | | | |
|---|---|---|---|
| 875,253 | 4/1953 | Germany | 55/391 |
| 934,293 | 8/1963 | United Kingdom | 55/337 |

*Primary Examiner*—Bernard Nozick
*Attorney, Agent, or Firm*—Parrott, Bell, Seltzer, Park & Gibson

[57] ABSTRACT

Airborne liquid particulate matter, such as particles of grease and the like originating in a food preparation area with a building, are disposed of by a two stage method and apparatus in which flowing air and conveyed particulate matter are first passed through a collection chamber for separation of most of the conveyed particulate matter from the flowing air and the flowing air and any remainder of the conveyed particulate matter are then passed into a disposal device which removes the remainder of the matter before passing the air to the ambient atmosphere.

1 Claim, 10 Drawing Figures

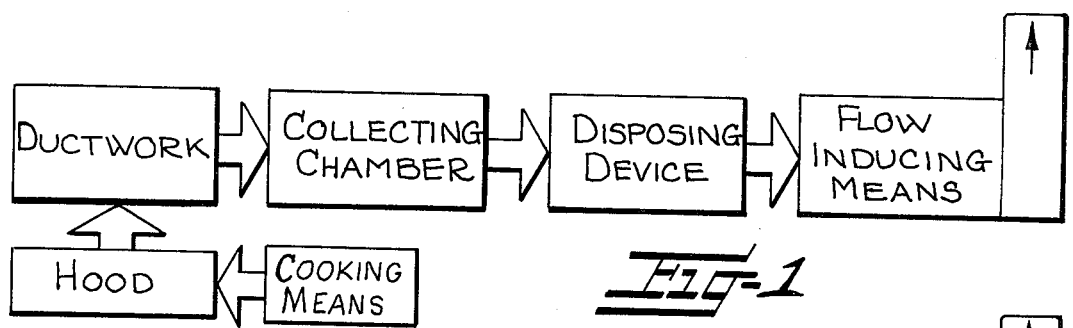
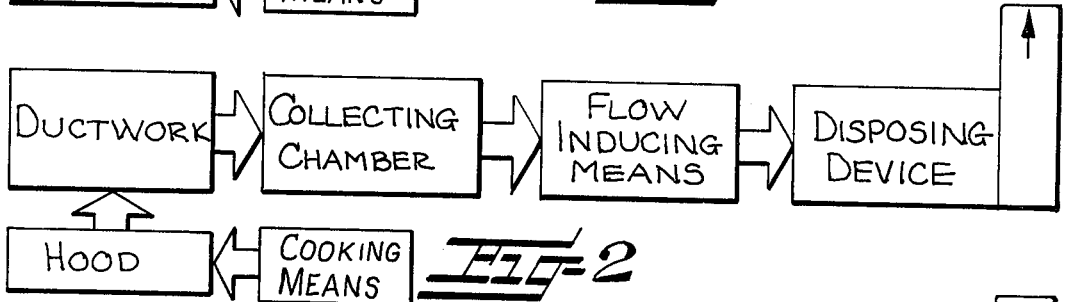
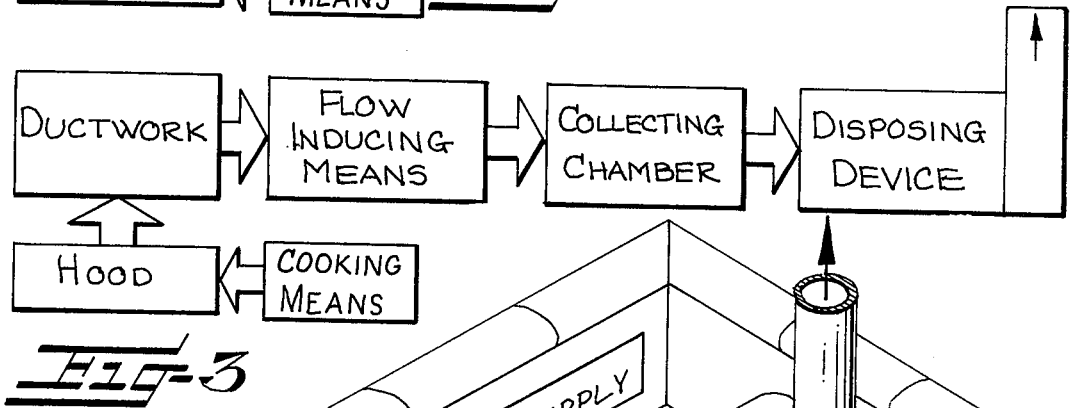
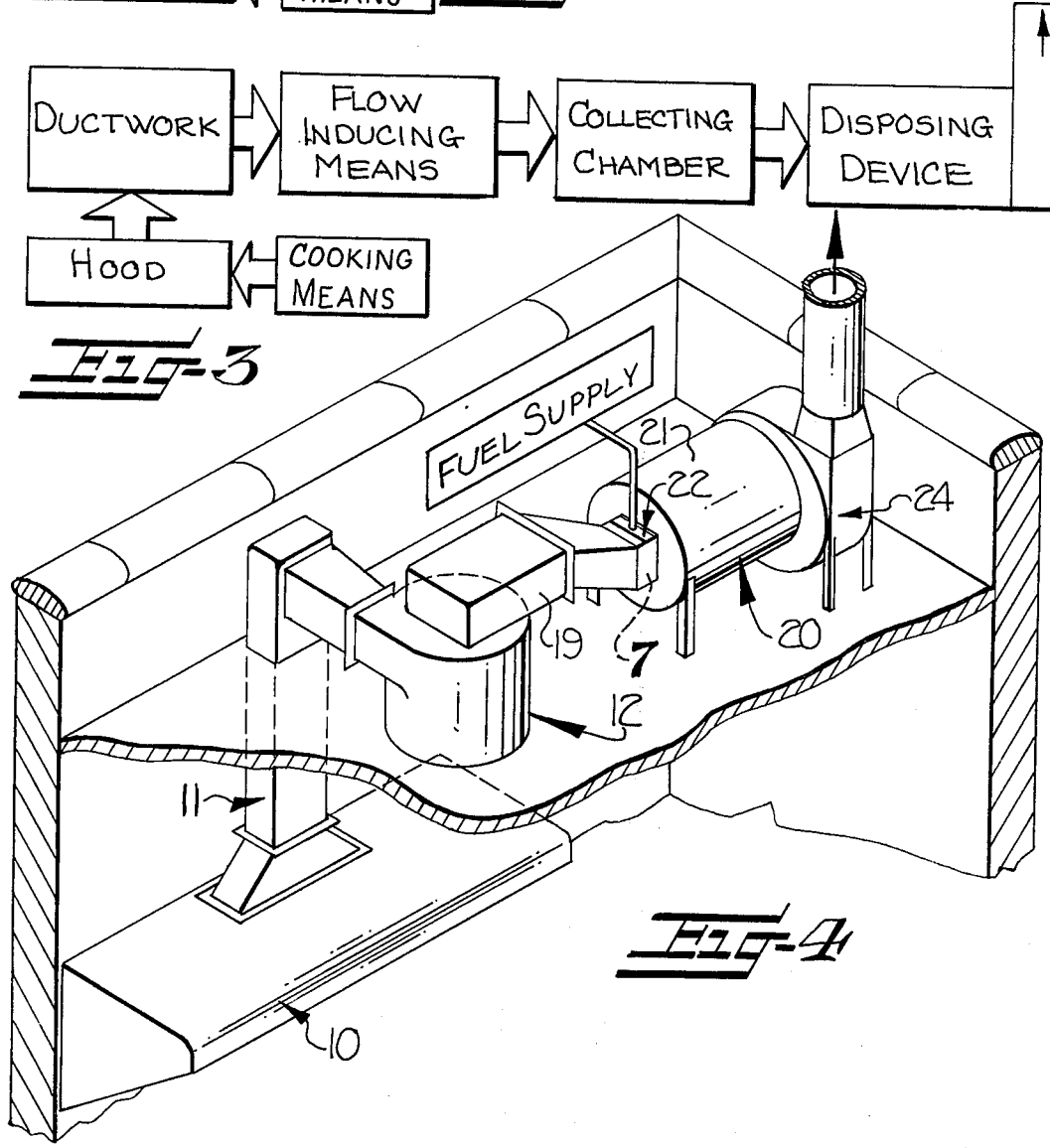

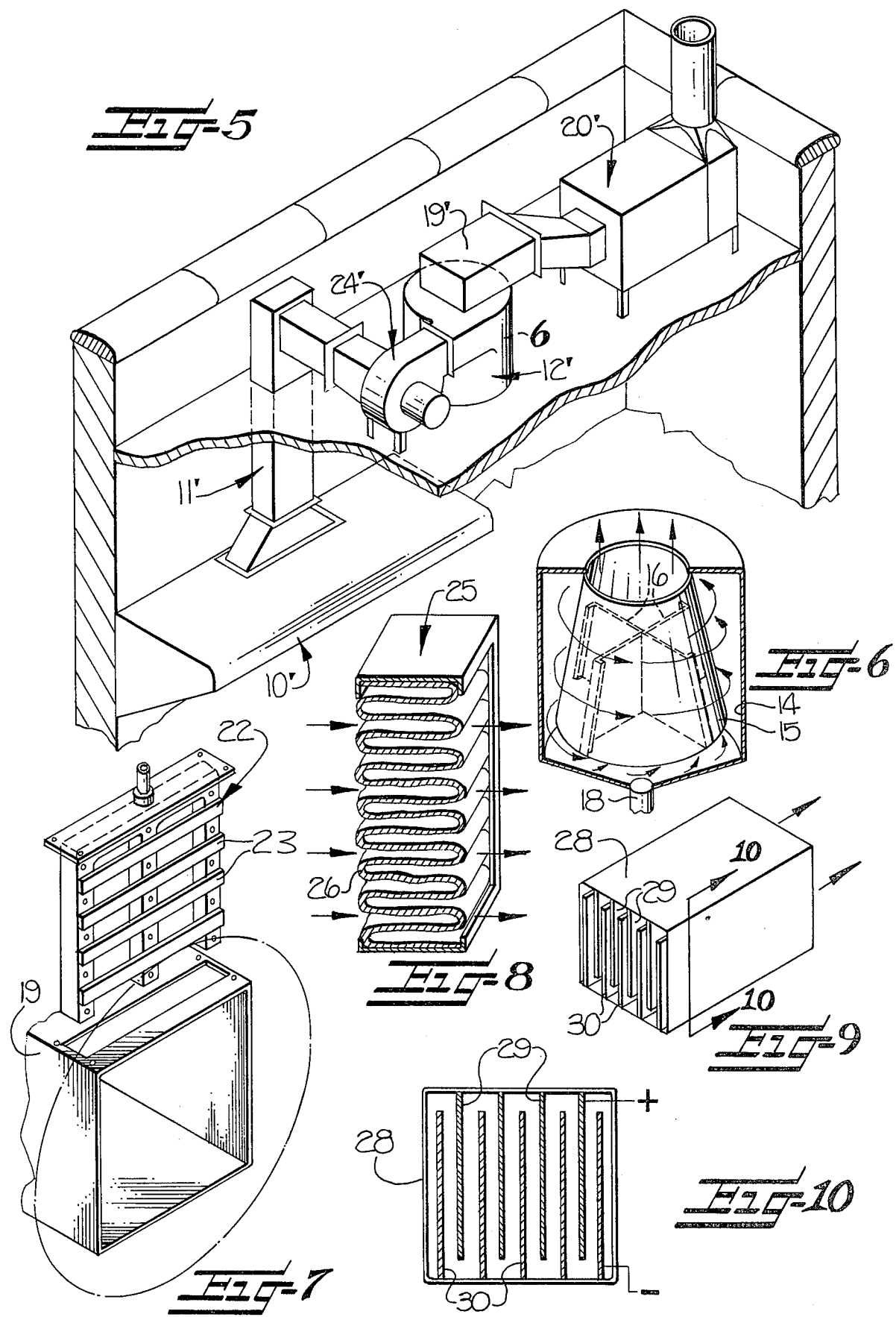

APPARATUS FOR DISPOSING OF AIRBORNE PARTICULATE MATTER AND COOKING MEANS

Increasing emphasis in recent years on controlling the quality of the environment has lead to a particular concern with the discharge of airborne liquid particulate matter which has heretofore been accepted practice in the ventilation of areas within buildings where such matter is generated. In particular, air pollution control measures now place stringent restrictions on restaurants and the like which employ charbroilers and friers in the preparation of foods.

In efforts to meet the stringent requirements, attempts have been made to employ known prior art devices such as high efficiency filters and electrostatic precipitators. Conventionally, such attempts at removing conveyed particulate matter such as particles of liquid grease have been of relatively short lived success, if any, due to the accumulation of large quantities of grease in the disposal devices. With such accumulations, high efficiency filters and electrostatic precipitators become inoperative and thus fail to comply with the applicable regulations.

A more successfully applied technique has been the use of a combustion device for disposing of particles of liquid grease and the like. Such combustion devices, which have come to be known as afterburners, have been found to be more satisfactory than high efficiency filters or electrostatic precipitators, but still can encounter specific operational problems resulting from accumulation of excessive quantities of particulate matter within the combustion chamber.

With a view to correcting the deficiencies and difficulties encountered in previous attempts to assure continuing compliance with pertinent regulations, it is an object of this invention to accomplish the disposal of airborne liquid particulate matter through a two stage method and apparatus, whereby liquid particulate matter is conveyed from a location within a building to a location outside the building and is there subjected to an initial separation and subsequent removal of the remainder of the conveyed matter from the air. By operating in such a two stage process, techniques which have heretofore been unacceptable as failing to maintain compliance over extended periods of time may be made operable on a commercially feasible basis.

A further object of this invention to maintain the operating efficiency of a disposal device such as a high efficiency filter, an electrostatic precipitator or an afterburner by separating from a flowing stream of air delivered thereto most of the conveyed liquid particulate matter otherwise flowing to the disposal device with the air stream. In realizing this object of the present invention, flowing air and conveyed particulate matter is directed along an at least partially circular, sharply turning flow path within a collection chamber prior to being directed to the disposal device.

Some of the objects and advantages of the invention having been stated, others will appear as the description proceeds, when taken in connection with the accompanying drawings, in which FIG. 1 is a diagrammatic representation of a first method and apparatus in accordance with this invention;

FIG. 2 is a representation similar to FIG. 1 of a modified arrangement in accordance with this invention;

FIG. 3 is a representation similar to FIGS. 2 and 1, of a second modified arrangement in accordance with this invention;

FIG. 4 is a perspective view, partially in section, of an arrangement in accordance with this invention incorporating an afterburner and a pull-through flow inducing means in accordance with the diagram of FIG. 1;

FIG. 5 is a view similar to FIG. 4, showing an arrangement incorporating a push-through flow inducing means as diagrammatically represented in FIG. 3;

FIG. 6 is a perspective view, partially in section, of a collecting chamber as incorporated in the systems of FIGS. 1 through 5;

FIG. 7 is a perspective view, partially exploded, of a portion of a combustion arrangement incorporated in arrangement of FIG. 4;

FIG. 8 is an enlarged perspective view, partially in section, of a high efficiency filter such as may be incorporated in the arrangement of FIG. 5;

FIG. 9 is a perspective view of an electrostatic precipitator as may be incorporated in the arrangement of FIG. 5; and FIG. 10 is an elevation view, partially in section, of the electrostatic filter of FIG. 9, taken generally along the line 10—10 in that figure.

The description which follows will set forth those forms of the present invention which are presently contemplated as the best forms for this invention. In the description, a range of possible variations for the various forms of this invention will be described. In view of the various modifications of this invention which will be described and the anticipation that other modifications may perhaps be made, the description is to be read in the sense of a broad teaching of the invention and not in the sense of a restriction or limitation on the scope of the invention.

As diagrammatically represented in FIGS. 1 through 3, this invention teaches the disposal of airborne liquid particulate matter, such as particles of grease and the like originating at a food preparation area within a building, by the induction of air to flow into and through an air flow guide, the direction of the flowing air and conveyed particulate matter along an at least partially circular, sharply turning flow path within a collection chamber for separating most of the conveyed particulate matter from the flowing air, the direction of the flowing air and the remainder of the conveyed matter into a disposal device for removing the remainder of the conveyed matter from the flowing air, and the delivery of cleaned flowing air to the ambient atmosphere. It is anticipated that the air flow inducing means or fan may be arranged to draw or suck air flow through a hood, duct work, collecting chamber, and disposing device (FIG. 1). Alternatively, the flow inducing means or fan may draw air flow through the hood, ductwork, and collecting chamber, while forcing air flow through the disposing device (FIG. 2) or may draw air flow through the hood and ductwork while forcing air flow through the collecting chamber and disposing device (FIG. 3).

In accordance with an important feature of this invention, the disposition of a collecting chamber in series flow relation with a disposal device and in advance of the disposal device accomplishes satisfactory disposal of airborne particulate matter with a variety of disposal devices. In particular, it is contemplated that the present invention will make possible or improve the operation of high efficiency filters, electrostatic precipitators and afterburners.

Referring now to one particular arrangement as illustrated in FIG. 4, a hood generally indicated at 10 is disposed within a building structure to overlie a food preparation area in which particles of grease and the like become airborne liquid particulate matter. As is known, such action occurs in many fast service restaurants due to the use of charbroilers, friers, and the like. Operatively communicating with the hood 10 is a duct system including a riser duct 11 which penetrates the building structure to extend to the roof area thereof. By means of the duct 11, operative communication is opened between the hood 10 and a collecting chamber defined within a structure generally indicated at 12.

Flowing air and conveyed particulate matter passing through the hood 10 and duct 11 are directed into the collecting apparatus 12 and are there directed along an at least partially circular, sharply turning flow path (FIG. 6). At the same time, the flow of the air is accelerated by passing the air flow through a least cross-sectional area defined between the inner wall of a cylindrical member 14 and the outer edge of the lower terminal end of an internal cone member 15. Inasmuch as air flowing into the collection structure 12 enters the structure tangentially to the inner wall of the cylindrical member 14, adjacent the upper end of the interior conical member 15, the flow is swirled within the collection structure 12 and, on passing beneath the lower terminal end of the conical inner member 15, is straightened by flow straightening vanes 16. This action separates most of the conveyed particulate matter from the flowing air, and separated grease flows from the collection chamber structure 12 through a drain pipe 18, for collection at an appropriate remote location.

The flowing air and the remainder of the conveyed particulate matter passes upwardly from the collection chamber structure 12 to an intermediate duct 19, by which the flow is directed into a disposal device generally indicated at 20.

In the form here described, the disposal device 20 is an afterburner, including a generally cylindrical combustion chamber portion 21 and a burner generally indicated at 22 disposed immediately upstream of the combustion chamber 21. By means of the burner 22, a suitable fuel such as a combustible gas is supplied from an appropriate source (schematically illustrated in FIG. 4) and is ignited for burning the remainder of the conveyed particulate matter within the combustion chamber. Such burning takes place at a flame front defined by a group of parallel flat bar flame holder members 23, mounted in a common plane on manifold members through which the combustible gas is supplied. By the separation of most of the conveyed particulate matter prior to the delivery of the flowing air in the remainder thereof into the disposal device 20, the possibility of overloading the disposal device 20 and of destructive excessive combustion therewithin is avoided.

Cleaned air flowing from the combustion chamber 21 enters the flow inducing means in the form of a suction fan generally indicated at 24 and is discharged by the fan into the ambient atmosphere.

The advantages realized by this invention and the two stage series flow removal of conveyed, airborne, liquid particulate matter further broaden the acceptability of other disposal devices, such as high efficiency filters and electrostatic precipitators. By way of example, FIG. 5 illustrates an arrangement broadly similar to the arrangement of FIG. 4 and which will now be described. Where components of the arrangement of FIG. 5 correspond to components of the arrangement of FIG. 4, prime notation is added to the reference characters applied. Thus, a hood 10' operatively communicates with a duct 11' in passing a flowing stream of air and particulate matter entrained therein outside of a building structure. Such flow is induced by an air flow inducing means or fan 24' mounted outside the building for drawing air through the hood 10' and duct 11'. The fan 24' forces the flow of air and entrained liquid particulate matter into a collection structure 12', in which most of the conveyed particulate matter is separated from the flowing air. The flowing air and the remainder of the conveyed matter is directed by a duct 19' to a disposal device 20'.

In accordance with this invention, the disposal device 20' may take one of two forms. First, as illustrated in FIG. 8, the disposal device 20' may incorporate frame means 25 and high efficiency filter media 26 such as folded paper sheet mounted within the frame 25. On passage of the flowing air through the high efficiency filter media 26, the remainder of the conveyed particulate matter is removed from the flowing air. Due to the separation of most of the conveyed matter in the collection chamber strucure 12' and the cleaning efficiency of the filter media 26, compliance with pertinent regulations is assured while a satisfactory operating life for the filter media 26 is obtained.

In yet a further variation of the modified system illustrated in FIG. 5, the disposal means 20' may incorporate an electrostatic filter as schematically illustrated in FIGS. 9 and 10. As is generally known to persons familiar with electrostatic filters, such filters include frame means as indicated at 28 and a plurality of electrically charged plates 29, 30 mounted within the frame means. Due to opposite polarity direct current electrical charges on the plates 29, 30 an electrostatic field is established which causes migration of the particulate matter conveyed by air flowing through the electrostatic precipitator to one or the other of the plates, thereby removing the particulate matter from the air. Again, due to the separation of most of the conveyed particulate matter in the collection chamber structure 12' and the efficiency of the electrostatic precipitator 28, compliance with applicable regulations is assured while satisfactory operating conditions for the electrostatic filter 28 are maintained.

In the drawings and specification, there has been set forth a preferred embodiment of the invention, and although specific terms are employed, they are used in a generic and descriptive sense only and not for purposes of limitation.

That which is claimed is:

1. The combination of cooking means disposed in a food preparation area within a building for the preparation of food and from which particles of grease and the like become airborne liquid particulate matter, air flow guide means for directing air flow and including a hood positioned above said area and said cooking means and duct means extending from said hood, means for inducing air to flow from said area within the building into and through said hood and said duct means at such velocities as to entrain with the flowing air at least the major portion of airborne particulate matter originating in said area and for conveying the particulate matter in an unrestricted manner from said area, an elongate container having a generally right circular cylindrical inner wall surface and interposed between said duct means and said air flow inducing means in series flow relation with said air flow inducing means for receiving the flowing air and conveyed particulate matter, directing means operatively associated with said elongate container for directing flowing air and conveyed particulate matter entering said container generally at a right angle to the longitudinal axis of said container and tangentially to said inner wall surface and for directing flowing air and particulate matter longitudinally and circularly within said container and in a first direction generally along said longitudinal axis for accelerating and sharply turning flowing air to leave the container generally along the longitudinal axis in a direction opposite the first direction therealong for separating most of the conveyed particulate matter from the flowing air and for retaining the separated particulate matter while passing the flowing air and the remainder of the conveyed particulate matter onward toward said air flow inducing means, and combustion means for burning the remainder of the conveyed particulate matter and located outside the building in series flow relation with said flow inducing means and said elongate container, said combustion means receiving flowing air and the remainder of the conveyed particulate matter and having a plurality of flame holder members arranged to define a plane perpendicular to the flow direction of the flowing air and at which combustion of the remainder of the conveyed particulate matter occurs while the flowing air passes to the ambient atmosphere.

* * * * *